Patented Dec. 18, 1923.

1,478,137

UNITED STATES PATENT OFFICE.

WALTER NEBEL, OF SIOUX CITY, IOWA.

MANUFACTURE OF CELLULOSE ACETATES.

No Drawing.     Application filed June 16, 1920.   Serial No. 389,398.

*To all whom it may concern:*

Be it known that I, WALTER NEBEL, a citizen of the United States, residing at Sioux City, in the county of Woodbury and State of Iowa, have invented a new and useful Improvement in the Manufacture of Cellulose Acetates, of which the following is a specification.

The present invention relates to the manufacture of cellulose acetates and will be fully understood from the following description of a specific example thereof.

The cellulose material to be converted into the acetate is initially disintegrated by subjecting it to the action of five times its weight of anhydrous or glacial acetic acid, to which hydrochloric acid, or its equivalents, hydrobromic or hydriodic acid has been added. Although stronger concentrations of the added hydrohalic acid may be utilized, it has been found that the most advantageous results are secured by using, for example, hydrochloric acid in a concentration below tenth normal (N/10) in the acetic acid. The mixture of cellulose with the acetic and hydrochloric acid is then heated for a sufficient period of time to effect the disintegration of the cellulose. The temperature and time of treatment may be varied in accordance with the concentration of the hydrohalic acid in the acetic acid. Thus with a concentration of 30th normal (N/30) hydrochloric acid in acetic acid the disintegration may be effected by heating at about 65° C. for about 16 hours. With a more concentrated hydrochloric acid the time of treatment at substantially the same temperature may be reduced or the temperature and the time of treatment held the same. With lower concentrations more elevated temperatures or longer periods of time may be utilized.

After disintegration of the cellulose in the above described manner approximately half of the solution of hydrochloric acid or its equivalent in acetic acid is expressed from the cellulose and acetic anhydride together with a suitable catalyst or condensing agent added thereto. Anhydrous zinc chloride has been found to be a suitable and efficient condensing agent for this purpose. The total amount of acetic anhydride utilized may be about twice to three times the weight of cellulose initially used. Thus, about three times the weight of cellulose of 85% acetic anhydride containing 7% of anhydrous zinc chloride may be utilized, being preferably added to the disintegrated cellulose mixture in several portions with constant agitation, so that the temperature does not rise above about 75° C. This temperature is maintained until the mass has attained a clear sirupy consistency and is substantially free from unacted-upon fiber.

Hydration of the cellulose acetate contained in the reaction mixture is now effected by adding to the latter an equal weight of a dilute aqueous solution of a hydrohalic acid, for instance hydrochloric acid, and heating the mass for a considerable period of time, for example, at a temperature of about 75° C. for about fifteen hours. After hydration of the acetate has been effected, the mass may be poured into water, or into another non-solvent liquid, such as chloroform or alcohol, washed free from acid and dried. The cellulose acetate obtained in this manner is found to be soluble in acetone, diacetone-alcohol, methylethyl ketone, and benzal-dehyde and to be insoluble in chloroform, ethyl alcohol and amyl acetate.

It is readily apparent that the cellulose material employed may be that of cotton or if desired, of wood or other cellulosic material. Furthermore, the specific proportions, temperatures, times, etc., above set forth may be varied in the various stages of the process described without departing from the invention.

Although the present invention has been described in connection with a specific example of its employment, it is not intended that the detailed specifications given shall be regarded as limitations upon the scope of the invention, except as included in the accompanying claims.

I claim:

1. In the process of manufacturing cellulose acetate, the step of disintegrating cellulose which consists in treating the celluose with a dilute solution of a hydrohalic acid in anhydrous acetic acid.

2. The process of disintegrating cellulose for the manufacture of cellulose acetate which consists in heating the cellulose with a solution of hydrochloric acid in acetic acid, the concentration of hydrochloric acid therein being less than 10th normal (N/10).

3. The process of disintegrating cellulose for the manufacture of cellulose acetate which consists in heating the cellulose with a solution of hydrochloric acid in acetic acid, the concentration of hydrochloric acid being less than 10th normal (N/10) and the time of heating being inversely proportioned to the concentration of the hydrochloric acid.

4. The process of preparing cellulose acetate which consists in disintegrating cellulose by means of a dilute solution of a hydrohalic acid in acetic acid, expressing a portion of said solution from the disintegrated cellulose and condensing the disintegrated cellulose with acetic anhydride in the presence of the remainder of said solution and a suitable condensing agent.

5. The process of preparing cellulose acetate which consists in disintegrating cellulose by means of a 30th normal (N/30) solution of hydrochloric acid in acetic acid, removing a portion of said solution, adding to the remaining mixture acetic anhydride and zinc chloride and heating the resulting mixture to effect acetylation of the cellulose.

6. The process of preparing hydrated cellulose acetated which consists in disintegrating cellulose in a dilute solution of hydrochloric acid in acetic acid, removing a portion of said solution, heating the remaining mixture with acetic anhydride in the presence of zinc chloride to effect the production of cellulose acetate, and adding to the resulting mass hydrochloric acid and heating the mixture until hydration of the cellulose acetate is effected.

WALTER NEBEL.